(12) United States Patent
Pearl

(10) Patent No.: US 6,709,598 B1
(45) Date of Patent: Mar. 23, 2004

(54) MEMBRANE FILTRATION DEVICE

(75) Inventor: Steven R. Pearl, Nashua, NH (US)

(73) Assignee: Millipore Corporation, Billerica, MA (US)

(*) Notice: Subject to any disclaimer, the term of this patent is extended or adjusted under 35 U.S.C. 154(b) by 0 days.

(21) Appl. No.: 09/530,255

(22) PCT Filed: Oct. 30, 1998

(86) PCT No.: PCT/US98/23104

§ 371 (c)(1), (2), (4) Date: Apr. 26, 2000

(87) PCT Pub. No.: WO99/22851

PCT Pub. Date: May 14, 1999

Related U.S. Application Data

(60) Provisional application No. 60/064,577, filed on Nov. 4, 1997.

(51) Int. Cl.[7] .......................... B01D 61/00; B01D 63/00
(52) U.S. Cl. .................. 210/650; 210/321.8; 210/263; 210/195.2; 210/97
(58) Field of Search .................. 210/321.78, 321.79, 210/321.8, 321.87, 321.89, 321.9, 263, 500.23, 195.2, 651, 97, 650

(56) References Cited

U.S. PATENT DOCUMENTS

| 3,598,728 A | * | 8/1971 | Bixler et al. |
| 4,323,457 A | * | 4/1982 | Sun et al. |
| 5,139,668 A | | 8/1992 | Chuen et al. |
| 5,242,597 A | * | 9/1993 | McArdle |
| 5,525,144 A | | 6/1996 | Gollan |
| 5,693,230 A | * | 12/1997 | Asher |

FOREIGN PATENT DOCUMENTS

| WO | WO 94/09889 | 5/1994 |
| WO | WO 97/05946 | 2/1997 |
| WO | WO 97/30779 | 8/1997 |

* cited by examiner

Primary Examiner—Ana Fortuna
(74) Attorney, Agent, or Firm—John Dana Hubbard

(57) ABSTRACT

One or more hollow fiber membranes having a coflow of filtrate to provide trans-membrane pressure (TMP) control. The membranes preferably are capable or forming a shear effect or Dean vortices at their inner surface. Optionally, the filtrate channel may contain one or more types of beads, either inert or formed of a capture resin such as affinity chromatography beads or ion exchange resins, for selectively capturing and retaining certain molecules from the filtrate of feedstream. The beads, in addition to the optional capture function, aid in the control of the TMP.

11 Claims, 4 Drawing Sheets

MEMBRANE FILTRATION DEVICE

This application claims the benefit of provisional application No. 60/064,577, filed Nov. 4, 1997.

This invention relates to a membrane based filtration device. More particularly it relates to a porous membrane system which allows for the filtration of products while controlling the transmembrane pressure in the device.

BACKGROUND OF THE INVENTION

The inability to control transmembrane pressure (TMP) causes increased rates of fouling especially in liquids having high particulate and/or colloidal concentrations such as biological broths. The high fouling results in an inconsistent filtration flow from the system.

Various solutions have been proposed to overcome this issue. One has been to run the device at lower flow rates in order to reduce the TMP differential from the feedstream inlet to the feedstream outlet. Alternatively, limiting the feed end TMP has been suggested as an option. Both are unacceptable as they reduce the performance of the system.

Another approach has been to use shorter module lengths which has not been acceptable as short modules are uneconomical to manufacture and use.

A third approach has been to increase the pressure on the filtrate side of the membrane device. While this works to reduce the average TMP over the length of the device, it fails to reduce the TMP differential from the feedstream inlet to the feedstream outlet, leading to fouling at the inlet.

A fourth approach has been to use baffles on the shell side of a hollow fiber device in order to assist in the control of TMP. Such a device is difficult to manufacture and use and provides only limited TMP control, especially in fluids which contain a high concentration of solids.

Lastly, the use of a separate pre-clarification step, such as one using coarse clarification pads to remove most of the large debris has been used. This is not acceptable as it adds an additional step and equipment cost.

None of the current approaches have effectively controlled the TMP and fouling of the system in a systematic and organised fashion while providing high throughput. What is desired is a system which allows for the optimum clarification, filtration and/or purification of products with high throughput volumes and TMP control. The present invention provides such a system.

SUMMARY OF THE INVENTION

The present invention comprises a porous hollow fiber membrane and the use of coflow on the filtrate side of the membranes so as to provide for TMP control of the system. Preferably, the addition of one or more beads on the filtrate side further improves the TMP control. The beads may be inert or they may be active, in that they may be size excluding glass or resin, an affinity resin, hydrophobic interactive chromatography resins, or an ion exchange resin which may be used to purify the filtrate stream by removing either a select desired specie in the filtrate or by removing a select contaminant from the filtrate stream.

One preferred embodiment of the present invention comprises a microporous hollow fiber bundle, said bundle being within a housing, said housing having a feedstream inlet on one end of the bundle and a feedstream outlet on another end of the bundle, said inlet and outlet being in communication with the inner cavity of the lumens of the bundle, said housing having a filtrate area between the outer surface of the bundle and the housing wall, said filtrate area having an outlet at one end of the housing, said filtrate outlet being connected to a downstream outlet and a recirculation loop, said loop being connected to a filtrate inlet adjacent the opposite of the housing from the filtrate outlet so as to allow the coflow of fluid on the filtrate side of the bundle in order to control the TMP differential.

A further embodiment of the present invention comprises a porous hollow fiber bundle, either microporous or ultraporous, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having an outlet, said filtrate outlet being connected to a downstream outlet and a recirculation loop, said loop being connected to a filtrate inlet at an end of the housing opposite that of the filtrate outlet inlet so as to allow the coflow of fluid on the filtrate side of the bundle and said filtrate area containing a series of beads which in combination with the coflow of fluid controls the TMP differential.

Another preferred embodiment of the present invention comprises a porous hollow fiber, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having an outlet, said filtrate area containing a series of capture beads capable of selectively retaining a desired specie of the filtrate stream and said filtrate outlet being connected to a downstream outlet and a recirculation loop, said loop being connected to a filtrate inlet at an end of the housing opposite the end containing the filtrate outlet such that the beads in combination with the coflow of filtrate controls the TMP of the system.

A further preferred embodiment of the present invention comprises a microporous hollow fiber bundle capable of forming vortices within its lumens so as to reduce fouling, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having an outlet, said filtrate area containing a series of capture beads capabie of selectively retaining a desired specie of the filtrate stream, said filtrate outlet being connected to a downstream outlet and a recirculation loop, said loop being connected to a filtrate inlet located in the housing at an end opposite that which contains the filtrate outlet in order to create a coflow of filtrate on the filtrate side of the membranes and wherein said loop has a pump and said loop and downstream connector are controlled by a valve for selection between the recirculating and the downstream direction.

An even further embodiment of the present invention comprises a porous hollow fiber bundle capable of forming vortices within its lumens so as to reduce fouling, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having an outlet and said filtrate outlet being connected to a downstream outlet and a recirculation loop, said loop being connected to a filtrate inlet adjacent the end of the housing adjacent the feedstream inlet and the filtrate area having one or more capture beads capable of selectively retaining a desired specie of the filtrate stream as well as for assisting in the control of the TMP of the system.

Also disclosed is a method of controlling the TMP of a filtration system comprising the steps of introducing a feedstock into one or more hollow fiber membranes, passing filtrate through the wall of the lumen into a filtrate channel, passing at least a portion of the filtrate through a recirculation loop back into the filtrate channel so as to create a suitable transmembrane pressure within the filtrate channel adjacent the outer wall of the membranes and removing the filtrate from the recirculation loop after a desired period of time.

Moreover, there is disclosed a method of backflushing a porous hollow fiber filtration system, wherein the system comprises a porous hollow fiber bundle, either microporous or ultraporous, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having an outlet, said filtrate outlet being connected to a downstream outlet and a recirculation loop, said loop being connected to a filtrate inlet at an end of the housing opposite that of the filtrate outlet inlet so as to allow the coflow of fluid on the filtrate side of the bundle and said filtrate area containing a series of beads which in combination with the coflow of fluid controls the TMP differential by the process of shutting off the feedstream to the housing, reducing the pressure on the feedstream side of the membrane to a level below that of the filtrate side and circulating a fluid through the recirculation loop at a pressure higher than that of the feedstream side of the membrane so as to backflush the membrane and remove any trapped contaminants within the membrane from the system.

Lastly, there is disclosed a method of controlling the TMP of a filtration system comprising the steps of introducing a feedstock into one or more hollow fiber membranes, passing filtrate through the wall of the lumen into a filtrate channel, wherein the filtrate channel is filled with one or more types or sizes of beads so as to create a suitable transmembrane pressure within the filtrate channel adjacent the outer wall of the membranes and removing the filtrate from the filtrate channel.

IN THE DRAWINGS

DETAILED DESCRIPTION OF THE INVENTION

Figure 1:
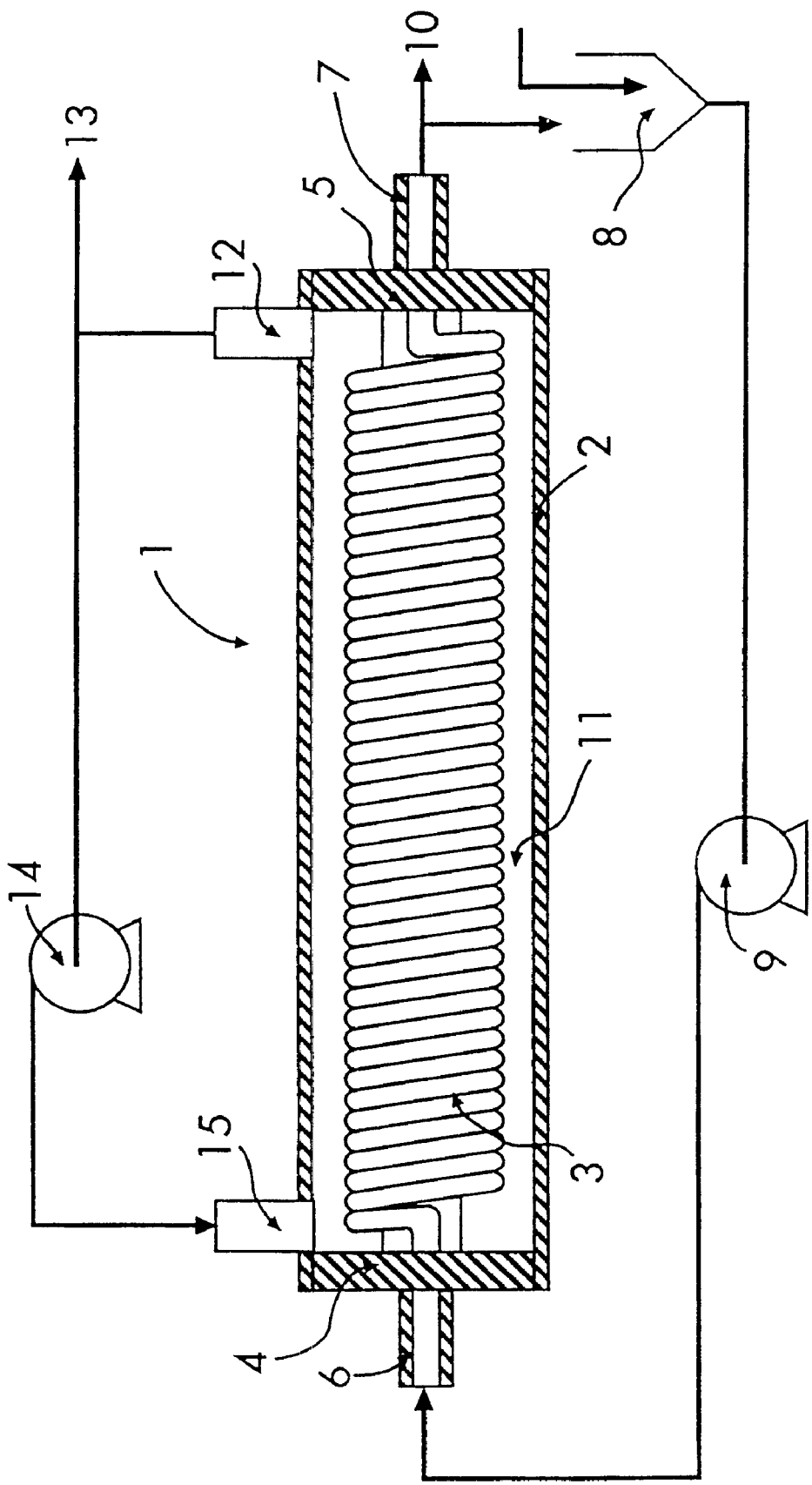
FIG. 1 shows a cross section of a preferred embodiment of the present invention.
Figure 2:
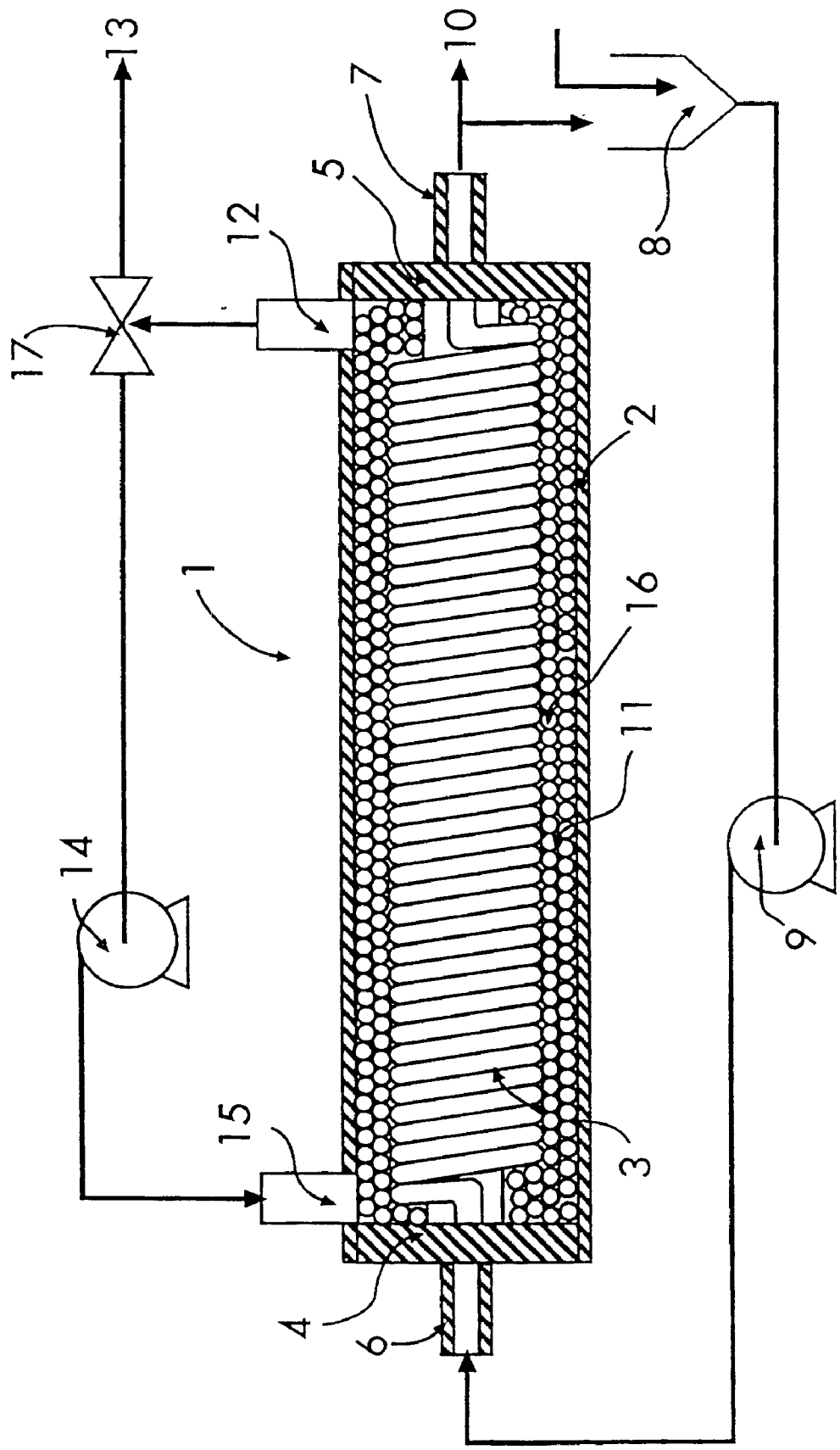
FIG. 2 shows a cross section of a second preferred embodiment of the present invention.

In FIG. 1 is shown a preferred embodiment of the present invention. The hollow fiber membrane cartridge 1, is formed of a housing 2, containing a bundle 3 of hollow fibers. In this embodiment, the fibers as shown are formed into a coiled bundle in order to create vortices, such as Dean vortices, within the fibers. Such a bundle and method making it is taught by U.S. Pat. No. 5,626,758 which is incorporated by reference herein in its entirety. Alternatively, straight hollow fibers may be used as shown in FIG. 2.

The bundle 3 is secured at its respective inlet and outlet ends 4,5, by a suitable end cap as taught in U.S. Pat. No. 5,626,758. Inlet end 4 has an inlet 6 and outlet end 5 has an outlet 7. The inlet 6 is connected to a feedstream reservoir 8 and is fed from the reservoir 8 by a feedstream pump 9. Alternatively, one could use gravity or a vacuum to move the feedstream into and through the bundle 3. The outlet 7 is connected to the feedstream reservoir 8 and/or a feedstream drain 10. Preferably, the outlet 7 contains a valve (not shown) which allows for the feedstream to be selectively switched to the reservoir 8 or drain 10 as desired.

Surrounding the bundle 3 within the housing 2 is a filtrate channel 11. The channel is connected to an outlet 12 adjacent the outlet portion 5 of the bundle 3. The filtrate outlet 12 is connected to an outlet stream 13 and to a recirculation pump 14 which can selectively recirculate at least a portion of the filtrate to the filtrate channel 11 via a filtrate inlet 15. Alternatively, the outlet stream 13 may be directed downstream for collection or further processing. As with the feedstream outlet 7 (above), the filtrate outlet 12 is preferably controlled by a valve(not shown) which allows one to select the desired flow pattern of the filtrate between the outlet stream 13 and the recirculation pump 14. Likewise, the outlet stream 13 may contain its own pump (not shown) or other means such as a control valve for insuring that the filtrate is properly moved and removed from the filtrate outlet 12 as desired or required.

In operation, the feedstream is fed to the interior of the hollow fiber bundle 3. Filtrate passes through the walls of the hollow fibers into the filtrate channel 11. The filtrate exits the housing via the filtrate outlet 12, where it can be passed on to further processing or collection via the outlet stream 13 or at least a portion of it is circulated via the recirculation pump 14 and the recirculation inlet 15 to the filtrate channel 11. Depending upon the amount of filtrate, the TMP differential which exists and the TMP which is desired, all or some of the filtrate is recirculated. As described above, the use of a valve is the easiest means for control the amount of filtrate which gets recirculated thus allowing one the greatest degrees of freedom in operation and control of the TMP in the system.

The feedstream exits the bundle 3 via the feedstream outlet 7 and may either be passed to a drain 10 for other processing or disposal or circulated to the feedstream reservoir 8 for additional passes through the device.

The use of a hollow fiber bundle 3 such as the Dean vortices bundle described above, allows the bundle to reduce fouling as the vortices sweep the inner surface of the fibers and remove any material which would otherwise lodge there and clog the micropores of the fiber and is therefore the preferred embodiment of the present invention. While fibers which incorporate the use of Dean Vortices are preferred as they provide excellent nonfouling capabilities, other similar fibers which create some type of shear or selfcleaning capability may be used. Additionally, as stated above, straight hollow fibers or other hollow fiber arrangements which do not create turbulence or vortices may also be used and are clearly encompassed by the present invention.

The hollow fiber selected depends upon the feedstream, filtrate and desired processing conditions that one will use. Materials and methods of making hollow fibers are well known to one of ordinary skill in the art. Typical materials include various polyolefins such as polyethylene, in particular, ultra high molecular weight polyethylene, various polysulphones such as polyethersulphone, nylon and other polyamides and PTFE and other fluorinated polymers such as FEP, PFA and MFA. Such fibers are available from a number of sources including Millipore Corporation of Bedford, Mass. and A/G Technologies of Needham, Mass.

The diameter of the hollow fiber can vary greatly depending upon the manufacturer and the polymer used. Typically the diameter of the hollow fiber is from about 0.2 mm to about 10 mm with a membrane wall (lumen) thickness of about 3 microns to about 1000 microns, preferably from 30 to 1000 microns. Preferably, the ratio of outside diameter to inside diameter of the fiber is typically 1.5:1 to about 2.5:1. The porosity is preferably from about 25% to about 90%, more preferably from about 40% to about 85%.

The hollow fiber membranes are either microporous or ultraporous. Microporous pore sizes preferably are from about 0.05 microns to about 10 microns. Ultraporous pore sizes are typically below 0.05 microns. The selection of the suitable pore size depends upon the application for which the product is used. Ultraporous membranes are preferred for diafiltration, nanofiltration, dialysis and reverse osmosis while microporous membranes are typically used for clarification, purification and size separation processes.

The use of the recirculation system for the filtrate allows for accurate control of the transmembrane pressure of the system. This is accomplished by generating a coflow on the filtrate side at a pressure gradient which is close to or preferably equal to the pressure gradient of the feedside of the membrane. Equalisation of the pressure gradients on each side of the membrane (feed and filtrate side) equalizes the TMP and allows for the most efficient flow of the product through the membrane. Preferably, the differential in TMP from one end of the membrane to other is less than 20%, more preferably less than 10% and most preferably 0%.

FIG. 2 shows another preferred embodiment of the present invention and to the extent that the components are identical to those of the embodiment FIG. 1 the same reference numerals have been used and will be applied.

In this embodiment the filtrate channel 11, is filled with beads 16. The term bead as used in this invention includes not only spherical beads but beads formed of other shapes such as cubes and other three dimensional polygonal shapes as well as cylinders, ovals and irregular shaped media. It also includes any fiber, fibrous mat, non-woven sheet or other device which may be placed into the filtrate channel in order to control TMP.

The beads may be formed of thermoset plastic such as epoxy, or a thermoplastic resin, such as polyethylene, polypropylene or PTFE. They may also be formed of agarose, cellulosic, such as regenerated cellulose, glass beads, such as controlled pore glass beads, or metal or metalloid-oxide materials, such as silica, chromia or tin oxide. The bead selected may have a diameter of from about 10 to about 1000 microns. Preferably, it has a diameter of from about 250 microns to about 700 microns. A preferred bead is a glass bead having a diameter of about 500 microns. Such beads are available from a variety of sources including Sigma Chemical of St. Louis, Mo.

Figure 3:
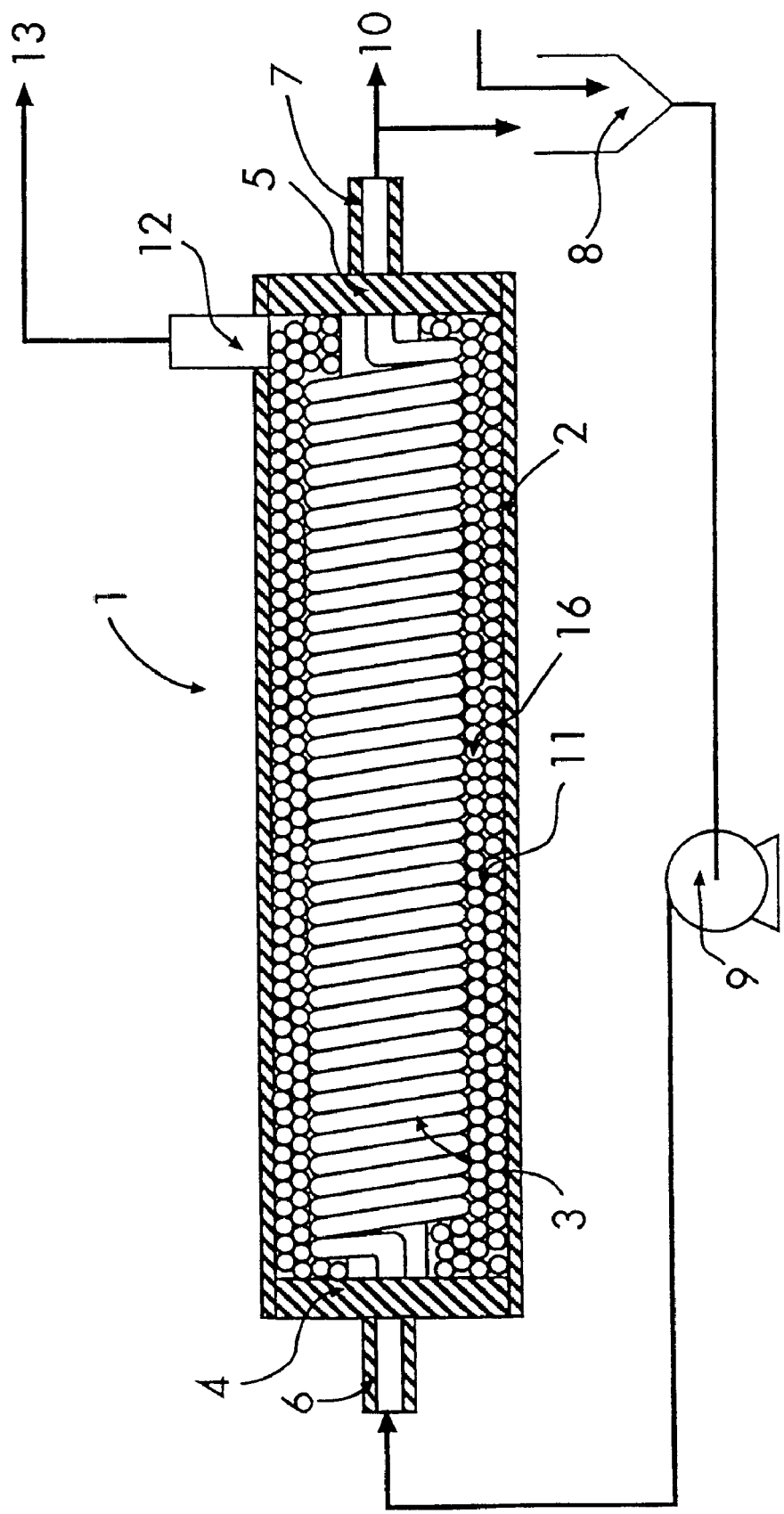
FIG. 3 shows a cross section of a third preferred embodiment of the present invention.

In this embodiment, the beads act to create resistance to the flow of filtrate which varies the pressure gradient at a given co-flow on the filtrate side. By doing so, one is able to control the TMP differential simply by using beads on the filtrate side, with no coflow required. FIG. 3 shows an embodiment in which the coflow loop has been eliminated and the use of the beads alone controls the TMP of the system.

One optional feature of FIG. 2 is the use of a two or three way valve 17 on the filtrate outlet 12 so as to allow one to select between recirculation and downstream processing. Optionally, the valve would allow for partial recirculation so that the proper level of pressure may be maintained on the filtrate side. The valve may be manually operated. However it is preferred to use a valve which can be automatically controlled. Solenoid valves and other electronically controlled valves are of particular advantage in such applications.

Additionally, it is preferred to use a pressure sensor (not shown) in either the embodiment of FIG. 1 or FIG. 2 on the feedstream inlet 6 and the recirculation inlet 15. These sensors may be used with conventional processing components such as a programmable logic controller (such as is taught in U.S. Pat. No. 5,772,867 which is incorporated herein by reference in its entirety) or software to monitor the pressures, control the flow and therefore the pressure on the filtrate side of the membranes which in turn controls the TMP differential across the membrane.

While the beads may be simply inert structures which merely help to control the TMP of the system, they may alternatively serve multiple purposes, such as to act both as a means to help control TMP as well to act as a capture bead for selected components of the fluid. In this instance, they may be a porous bead such as agarose, cellulose, silica or glass which has a certain pore size such that only components of a certain size may be retained within their pores. Alternatively, they may utilize another capture mechanisms such as ion exchange, affinity capture, or hydrophobic interactive chromatography resins to selectively capture and bind components.

Examples of capture resins which can be used in the present invention size exclusion materials such as agarose, cellulose or controlled pore glass, include ion exchange media such as CELLUFINE-Q anion exchange media available from Millipore Corporation in Bedford, Mass. and SEPHADEX and SEPHROSE media available from Pharmacia of Sweden and affinity chromatography beads such as HI TRAP PROTEIN A and HI TRAP PROTEIN G media available from Pharmacia of Sweden or ProSep A available form Bioprocessing Limited of Newcastle, England and hydrophobic interactive chromatography resins, such as Phenyl-Sephrose and Phenyl Superose from Pharmacia of Sweden.

More than one type of capture resin may be used in the system either as a homogeneous blend or as sequential areas within the housing (this is particularly useful for capturing materials which are known for quickly passing through the membrane).

In the embodiment where the beads have multiple functions( TMP and capture), the feedstock is run for a desired time, typically until the capture beads have reached their breakthrough (or saturation point). Once that time has been reached, the feed is shut off and an eluant is introduced into the filtrate cavity either through the membranes or through the filtrate inlet so as to recover the captured components. The recovery captured components may be removed via the filtrate outlet or from a separate outlet (not shown) if so desired. The use of eluants is well known to one of ordinary skill in the art and vary depending upon the type or types of beads used and the product which is captured and needs to be recovered. Typical eluants include water, various alcohols, salt solutions and blends thereof.

While this invention has been discussed with the preferred embodiment in the clarification and purification of biological products, its application is broader than that.

For example, it also provides an excellent mechanism for backflushing of the membrane in the system. To do so, one simply reduces the feedstream pressure by throttling an inlet valve or opening an outlet valve on the feed side. A suitable washing fluid (preferably filtrate) is introduced from a tank into the filtrate recirculation loop and it is circulated throughout the system. Pressure on the filtrate side is to be maintained at a level greater than that of the feedstream side of the membrane in order to remove any material which may have become lodged in or on the membrane. After a suitable amount of time, the operation is returned to normal processing conditions. The use of the co-flow allows for consistent and uniform backflushing of the system.

Additionally, it has application in the field of liquid filtration generally. One other preferred embodiment is in the field of filtration of liquids for electronic component manufacture, such as silicon chips and semiconductors. Here the beads could have an ion capture mechanism such as a ligand designed to capture metal ions, such as copper, iron, etc. from the filtrate stream. The system could use recirculation if desired in order to reach very low levels of ions in the filtrate, such as 10–50 ppb. Such ligands are well known and are typically allached to inorganic surfaces, such as silica powder. See U.S. Pat. No. 5,656,702 which is incorporated herein in its entirety.

Another embodiment of the present invention is to filter and deionized water so as to obtain pure (defined as 99.99% water) or ultrapure (defined as 99.999% water) water.

In this embodiment, one would use the device as shown in FIG. 3 with no recirculation or FIG. 2 with recirculation. The capture beads are those used in water deionization today, such as ion exchange resin beads.

EXAMPLE 1

Four hollow fiber modules each containing 3 fibers formed in a curved arrangement, with a winding diameter of 0.25 inch(6 mm) as taught by U.S. Pat. No. 5,626,758 and as shown in FIG. 1 of the present application was made. The Dean number for two of the modules was 364, the Dean number for the other two was 611, all clearly above the Critical Dean Number, indicating the formation of Dean vortices within the lumens during operation. All of the modules had a number of 500 micron diameter glass beads, purchased from Sigma Chemical of St. Louis, Mo., on their filtrate side of the housing.

A liquid comprised of 2% BSA, 0.2% RNA and 0.5% Dextran in a 0.1M sodium acetate buffer solution, pH of 5, was introduced into the interior of the fibers at a flux of 30 lmh.

The first module was run at a shear rate of 4390 s$^{-1}$ and a velocity of 72.5 cm.s$^{-1}$ and no co-flow.

The second module was run under the exact same shear rate and velocity with filtrate co-flow.

The third module was run at a shear rate of 7380 s$^{-1}$ and a velocity of 121.9 cm.s$^{-1}$ with no co-flow.

The fourth module was one under the exact same conditions as the third module with filtrate co-flow.

The transmembrane pressure in pounds per square inch was measured along with the amount of membrane loading or fouling measured by the amount of liters of filtrate per square foot of membrane available for filtration.

Figure 4:
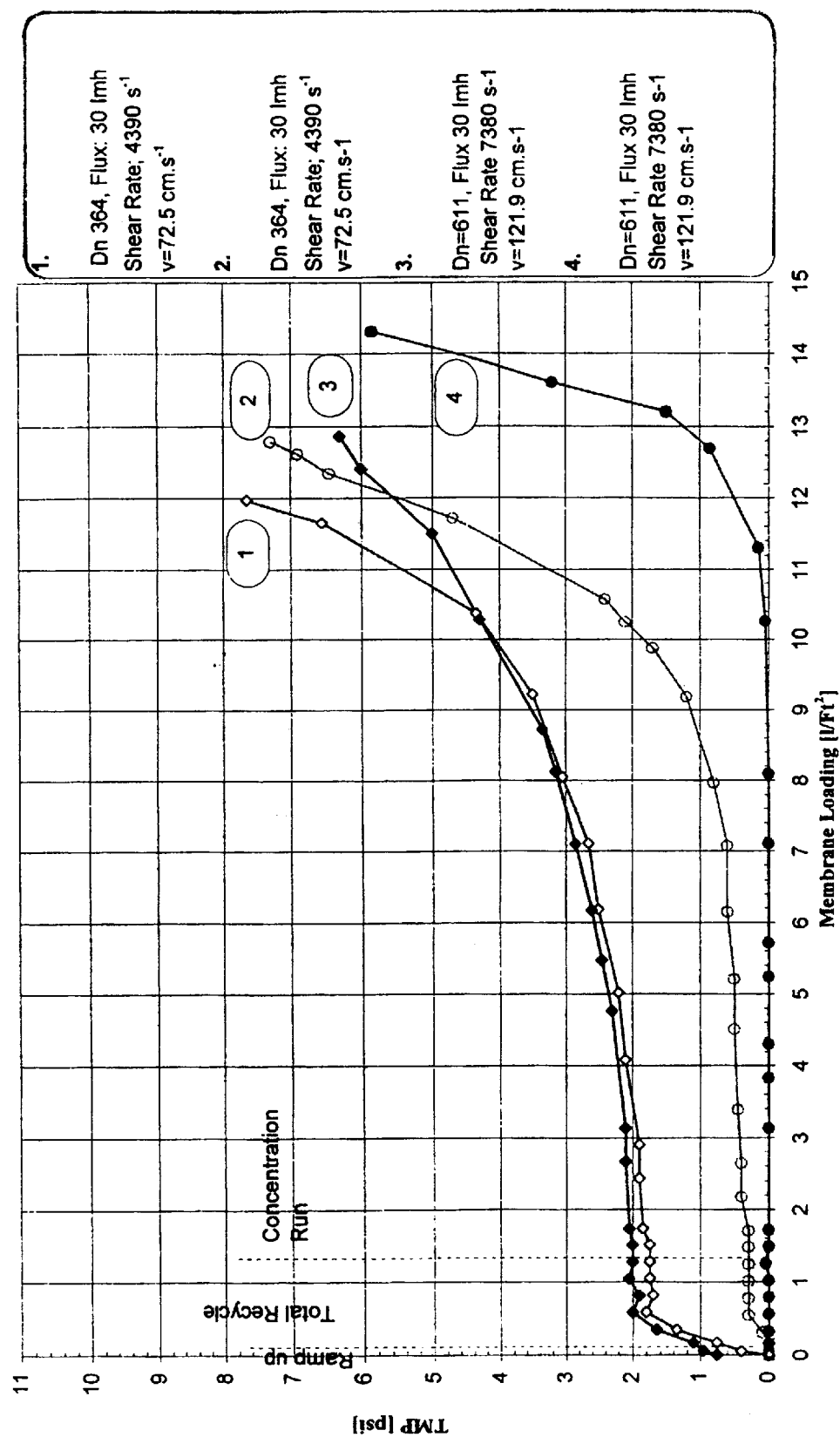
FIG. 4 shows a graph plotting the TMP and Membrane Loading values of the modules of Example 1, two using no co-flow, two using co-flow.

The values of TMP vs. membrane loading were recorded and plotted on the graph of FIG. 4.

As can be clearly seen from the data contained in FIG. 4, both modules when run in the co-flow mode, had lower rise in TMP at the same membrane loading than the modules run without co-flow. This means that one can obtain a higher capacity (more volume can be processed per square area of filter) than a system which does not utilize a co-flow.

While the present invention has been described in relation to its preferred embodiments, other modifications and/or embodiments can be used and are contemplated as being within the scope of the present invention.

What I claim is:

1. A hollow fiber device comprising a porous hollow fiber bundle wherein the bundle is formed of curved fibers, said hollow fibers are curved so as to create Dean vortices within the fibers, said bundle being within a housing, said housing having a feed stream inlet on one end and a feedstream outlet on another end, said inlet and outlet being in communication with the inner cavity of the lumens of the bundle, said housing having a filtrate area between the outer surface of the bundle and the housing wall, said filtrate area having an outlet and said filtrate outlet being connected to a downstream outlet and a circulation loop, said loop containing a pump for moving filtrate through the loop, said loop being connected to a filtrate inlet located at an end opposite the end of the housing containing the filtrate outlet and being capable of controlling transmembrane pressure of the device.

2. The hollow fiber device of claim 1 wherein the series of beads are selected from the group consisting of inert beads, capture beads capable of selectively retaining a desired specie of the filtrate stream and blends thereof.

3. The hollow fiber device of claim 1 wherein flow of the filtrate to the loop and downstream outlet are controlled by a valve for selection between the recirculation loop and the downstream outlet.

4. The hollow fiber device of claim 1 wherein the loop and downstream stream outlet for the filtrate is controlled by a valve, the valve being selected from the group consisting manual, solenoid and electronically controlled valves.

5. A hollow fiber filtration device comprising a porous hollow fiber bundle wherein the bundle is formed of curved fibers, said hollow fibers are curved so as to create Dean vortices within the fibers, said bundle being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area having a filtrate outlet, said filtrate area containing a series of beads and said filtrate outlet being connected to a downstream outlet and a recirculation loop containing a pump, said loop being connected to a filtrate inlet located at an end of the housing opposite to that containing the filtrate outlet.

6. The hollow fiber device of claim 5 wherein the beads are selected from the group consisting of size excluding beads, affinity resins, hydrophobic interactive chromatography resins, ion exchange resins and blends thereof.

7. The hollow fiber filtration device of any of claims 1 and 5 wherein the fibers are formed into a helical shape.

8. A hollow fiber filtration device comprising a microporous hollow fiber bundle, said bundle being formed of curved fibers, said hollow fibers are curved so as to create Dean vortices within the fibers, and being within a housing, said housing having a feedstream inlet on one end and a feedstream outlet on another end, said inlet and outlet being in communication with the inner cavity of the lumens of the bundle, said housing having a filtrate area between the outer surface of the bundle and the housing wall, said filtrate area containing a series of beads and said filtrate outlet being connected to a downstream outlet.

9. The process of claim 8 wherein the selective passing of the filtrate into the recirculation loop is controlled by a valve.

10. A process for controlling the transmembrane pressure of a hollow fiber membrane device comprising the steps of introducing a feedstock into one or more curved hollow fiber membranes, said hollow fibers are curved so as to create Dean vortices within the fibers, passing the filtrate through the wall of the lumen into a filtrate channel, selectively passing the filtrate through a recirculation loop back into the filtrate channel adjacent the outer wall of the membranes and removing the filtrate from the recirculation loop after a desired period of time.

11. The process of claim 10, wherein the curved hollow fiber membranes are formed into a helical shape.

* * * * *